United States Patent

[11] 3,624,343

| [72] | Inventors | Erik Stjernstrom<br>Milwaukee;<br>John G. Bollinger, Madison, both of Wis. |
|---|---|---|
| [21] | Appl. No. | 5,572 |
| [22] | Filed | Jan. 26, 1970 |
| [45] | Patented | Nov. 30, 1971 |
| [73] | Assignee | A. O. Smith Corporation<br>Milwaukee, Wis. |

[54] MEMBER DRIVE SYSTEM WITH CONSTANT VELOCITY IN A GIVEN PLANE
22 Claims, 8 Drawing Figs.

[52] U.S. Cl. .................................................. 219/125 PL,
318/578, 318/632
[51] Int. Cl. .................................................... B23k 9/12
[50] Field of Search .......................................... 219/124,
125, 137, 60; 318/578, 632

[56] References Cited
UNITED STATES PATENTS

| 2,415,080 | 2/1947 | Bonell | 318/30 |
|---|---|---|---|
| 2,457,532 | 12/1948 | Cunningham | 318/20.550 |
| 2,833,941 | 5/1958 | Rosenberg | 318/39 X |
| 2,927,735 | 3/1960 | Scuitto | 318/571 |
| 2,962,645 | 11/1960 | Rudolf, Jr. et al. | 318/571 |
| 3,300,696 | 1/1967 | Fillmore et al. | 318/20.160 |
| 3,500,150 | 3/1970 | Foster | 318/571 |

Primary Examiner—J. V. Truhe
Assistant Examiner—L. A. Schutzman
Attorney—Andrus, Sceales, Starke & Sawall ABSTRACT: A welding electrode is positioned with a specific relationship to a horizontal plane at a constant resultant velocity. An X-axis drive motor and a Z-axis drive motor are connected to drive the electrode in mutually perpendicular directions. An angle drive motor angularly orients the electrode to the horizontal plane.
A Z-axis tachometer provides a velocity signal as the input signal to an absolute function value generator, the output of which is applied to a quarter-circle signal generator. The latter includes an operational amplifier having a feedback circuit with a plurality of parallel paths each including a diode and a slope controlling resistor to successively vary the slope to produce a circle function output. This provides the proper input to the X-axis drive. A Z-axis position transducer controls the Z-axis drive and also provides a stablilizing control input to the X-axis drive and the angle drive.

PATENTED NOV 30 1971
3,624,343
SHEET 1 OF 2
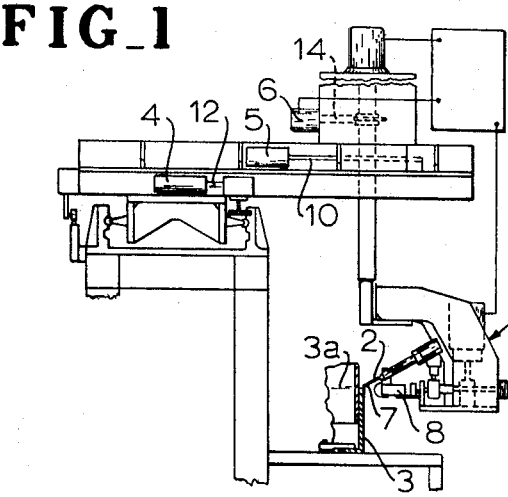
FIG_1
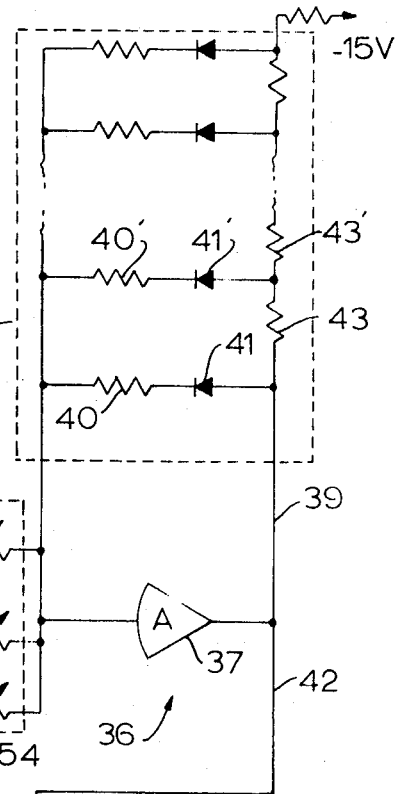
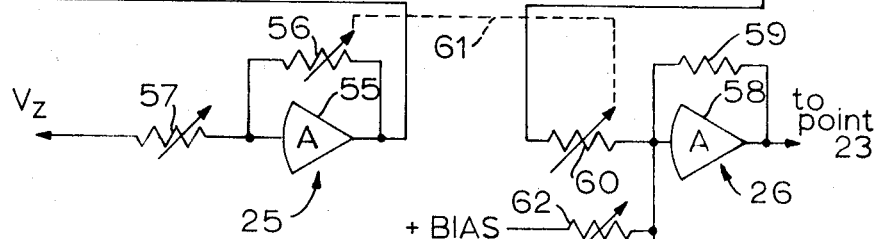
FIG_4
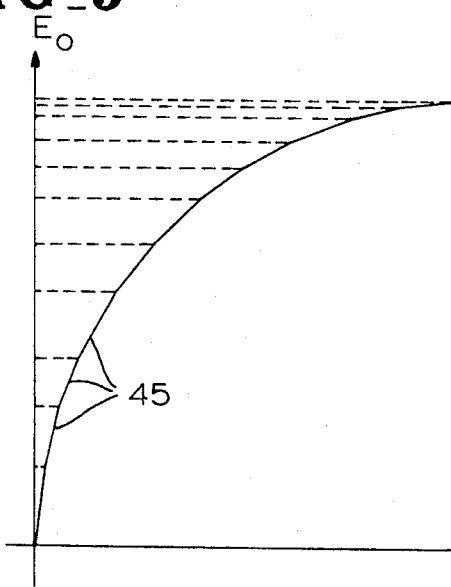
FIG_5
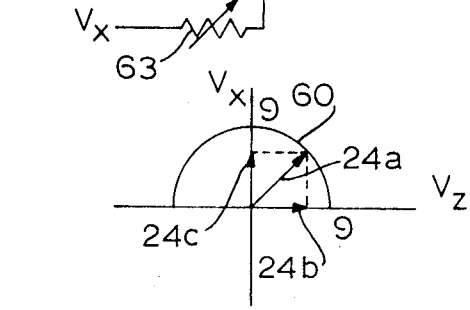
FIG_3
INVENTORS
ERIK STJERNSTROM
JOHN G. BOLLINGER
BY
Andrus, Sceales, Starke & Sawall
Attorneys

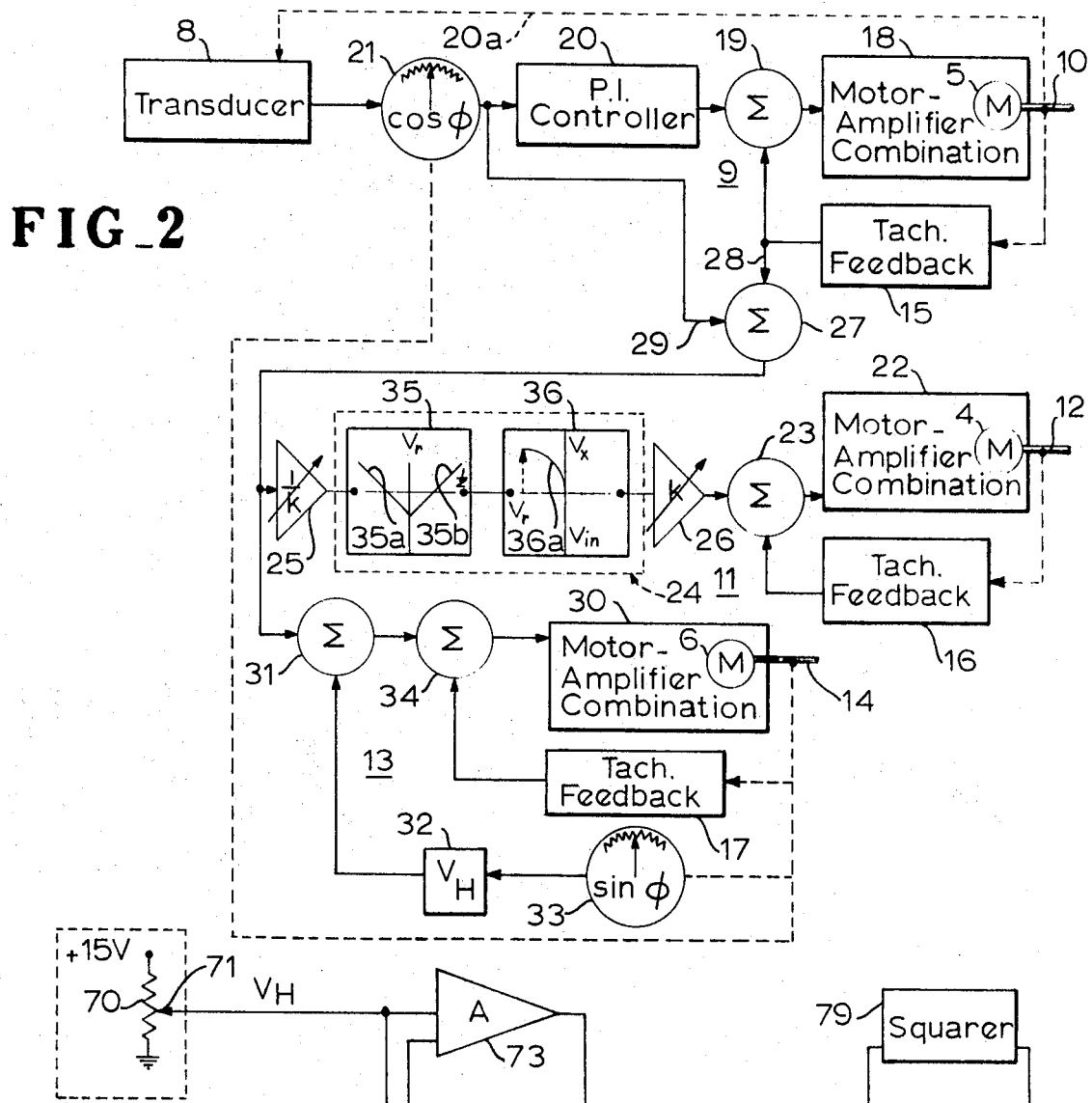
FIG_2
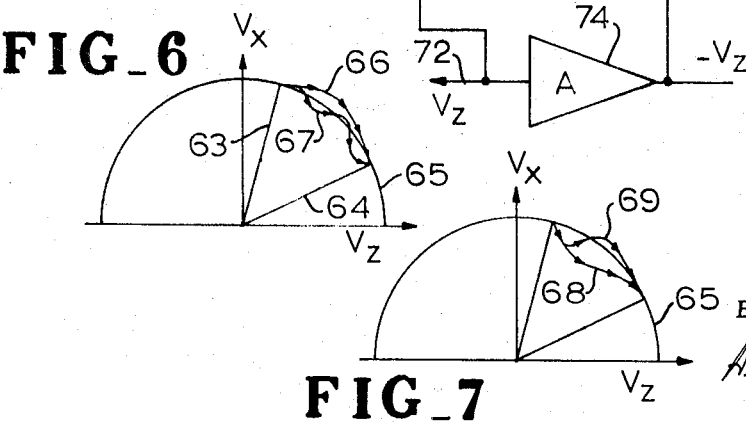
FIG_6
FIG_7
FIG_8
INVENTORS
ERIK STJERNSTROM
JOHN G. BOLLINGER
BY
Attorneys

MEMBER DRIVE SYSTEM WITH CONSTANT VELOCITY IN A GIVEN PLANE

BACKGROUND OF INVENTION

This invention relates to a member drive system for positioning a member such as a tool and particularly to a tracer system for maintaining a welding electrode or the like in predetermined relationship with respect to a welding seam.

In arc welding control systems and the like, a tracking element may be coupled to the seam or weld line immediately in front of or preceding the electrode and provide a control signal to establish a corresponding controlled movement of the electrode for accurate tracking of the weld line by the electrode. Thus, U.S. Pat. No. 3,452,180 issued to Bollinger et al. on June 24, 1969 particularly discloses a multiple axis seam tracking system particularly adapted for welding downhill. As more fully disclosed in such application, the electrode may move in a vertical or a horizontal plane. It is desired to maintain the electrode in predetermined angular relationship within the planes and particularly to maintain the electrode moving at a constant, resultant horizontal velocity vector in order to establish and maintain weld quality. The constant horizontal velocity vector can be obtained by controlling the movement in the several axes, where the X-axis is the horizontal feed direction in the direction of the weld, the Y-axis is the vertical direction and the Z-axis is the horizontal direction normal to the X–Y plane. As more fully disclosed therein, a reference input velocity voltage is compared with a computed horizontal velocity voltage based on the use of a suitable horizontal angle sine-cosine potentiometer sensing assembly attached to the tracer to vary the X-axis drive through a suitable closed loop control. In order to provide an adequate response, the overall gain of the forward control loop had to be relatively large such that relatively small changes in the horizontal velocity caused adequate adjustment of the velocity of the X-axis drive. However, the computed voltage based on the sine-cosine potentiometer made the system, particularly with a high gain in the loop, very sensitive to the changes in the angular position sensing. The slope of the seam in the horizontal plane may be continuously changing and the error in the feedback position may also be continuously changing. The horizontal velocity may tend to change continuously about its correct value and with the high gain of the forward drive loop, the X-axis closed loop system may not only respond undesirably but might even go into oscillation. The interaction between the controls for the axes drives and the angle drive resulted in a system with borderline stability characteristics. Applicant, therefore, realized the system should, for reliable and optimum results, decouple the X-axis control from the X-axis control. For example, in the copending application of Bollinger et al. entitled "Automatic Tracer for Positioning Control" which was filed on Jan. 24, 1969 with Ser. No. 793,860, a separate, angular cam control and a follower is provided to establish and maintain a constant horizontal velocity. The cam is constructed to define a continuous cam surface directly related to the desired angular control in the horizontal plane. This, in turn, results in complete separation of the Z-axis drive and the X-axis drive. However, it has the usual disadvantages associated with cam systems and, in particular, results in a relatively expensive and time-consuming construction to obtain a highly accurate and reliable tracking.

SUMMARY OF INVENTION

The present invention is particularly directed to an electrical control circuit employing a velocity sensing means sensing the velocity signal in the direction perpendicular to the controlled drive means, and interrelated through an independent modifying circuit to establish a drive signal maintaining the constant horizontal velocity of the member. In accordance with the present invention, an electronic active generating means is provided to generate a circle function, the radius of which is a vector which corresponds to the constant desired horizontal velocity and is defined by the corresponding perpendicular horizontal velocity component vectors, referred to as the X velocity and the Z velocity components for convenience. In accordance with the present invention, the change in the horizontal slope is detected by a Z-axis position sensing means such as a differential transformer means which drives the Z-axis drive means and results in actuation of a velocity signal transducer such as a tachometer. The velocity signal is employed as the input signal to the semicircle generating means which produces an X-axis velocity reference signal, thereby modifying the X-axis drive speed.

In a practical seam, the actual angle of the seam with respect to the X-axis will always be within plus and minus 45°. As a result, the change in magnitude of the gain from the Z-axis to the X-axis which is given by a factor equivalent to the slope of the semicircle, will always be less than or equal to one. As a result, an undesirable response of the Z-axis which, perhaps, could be caused by noise or the like, is attenuated before applied to the input of the X-axis.

In accordance with a particularly novel aspect of the present invention, the semicircle function is obtained by a combination of an absolute function value generator receiving the velocity input signal and applying it as an absolute value to a quarter-circle function generator, the output signal corresponds to that obtained with a semicircle generator. The quarter circle signal generator in one aspect of this invention includes an operational amplifier having a plurality of impedance means such as resistors selectively connected into the feedback circuit through voltage-sensitive diode means. As the output voltage increases through the several selected points, the diode means introduces changes in the feedback characteristic with a corresponding change in the slope of the output. In this manner, the output of the operational amplifier may be made to a close approximation of a semicircle formed by a plurality of straight line segments. An absolute value function generator may include an operational amplifier defining a generally V-shaped output function. The V-shaped function with plus and minus unity slopes is biased by a voltage equivalent to the radius of the semicircle. Thus, each of the output traces from zero of the function generator correspondingly establish a similar output and intersect the reference axis at the opposite ends of the desired semicircle output. An input related to the velocity in the perpendicular direction to the controlled direction thereby establishes an output to maintain the velocity in the control direction at that required to maintain a constant horizontal velocity.

The velocity related control will tend to lag the actual correction desired. In accordance with a further aspect of the present invention, practically instantaneous control can be obtained by superimposing upon the sensed velocity signal, the output of the position-sensitive control for detecting the change in the first direction. The position-sensed signal is modified by a cosine function generator such as a potentiometer interconnected to the horizontal angle-positioning system to provide a signal directly related to the error signal in the corresponding direction.

This same latter modifying signal is advantageously applied to control the Z-axis drive system and the angle drive such that the complete control of the electrode or other member in the selected plane is thereby responsive to a single input reference signal of the position-sensing means.

Because of the angular orientation of the position transducer to the edge or line to be traced, the effective gain of the tracing loop is not the same at all angles; for example, at 0° to 1°, the effective gain is less than at from 44° to 45°. Under such conditions, it was found that the system tended to be unstable at the angle of approximately 45°. The cosine function generator or element provides attenuation in the Z-axis drive control particularly at relatively large angles at which the electrode is positioned. This, of course, reintroduces an angle interaction into the corresponding axis drive. Although this might tend to introduce certain interrelated angle and direction errors, it has been found to provide an improved, practical solution. An alternative method would be to sense the velocity in the X-axis direction and employ that output, which is available as a part of the X-axis drive system, as a multiplying factor upon the output of the transducer signal. A further improvement would be to employ the control signal as it appears at the output of a circle generator. This signal is in phase with the velocity signal and by multiplication would provide a practically instantaneous correction. However, a multiplier is a relatively expensive device whereas the use of the cosine function potentiometer or the like is readily available as a relatively inexpensive component and provides a highly practice and inexpensive control system.

The addition of the modifying transducer-related voltage to the velocity-sensed feedback voltage in the angular drive will tend to further improve the response of such drive system.

In summary, the modifying transducer signal constitutes the one single source of information about a change in the slope of the weld or the work line in the given plane and, consequently, this single source may be applied to the three adjustment means comprising the two rectilinear drive axes and the angular axis drive in the given plane. The present invention has been found to provide a highly improved control for positioning of a tool in a given plane.

BRIEF DESCRIPTION OF DRAWINGS

The drawings furnished herewith illustrate the best mode presently contemplated by the inventors for carrying out the subject invention and clearly disclose the above advantages and features as well as others which will be readily understood from the following description.

In the drawings:

FIG. 1 is a diagrammatic illustration of an arc-welding assembly particularly adapted for use with the present invention;

FIG. 2 is a block diagram of the electrode positioning system for movement of the electrode in a horizontal plane in accordance with the present invention;

FIG. 3 is a graphical illustration of a portion of the X-axis drive shown in FIGS. 1 and 2;

FIG. 4 is a schematic circuit diagram of the X-axis drive system shown in FIG. 2;

FIG. 5 is a graphical illustration of a portion of the circuit shown in FIG. 3;

FIG. 6 is a diagrammatic graphical illustration of a pair of possible motions of the electrode positioning system for an overdamped response and underdamped response without modification of the control system shown in FIG. 2;

FIG. 7 is a view similar to FIG. 5 illustrating two similar possible movements with overcompensation of the velocity signal; and FIG. 8 is a block diagram of an alternative circular function generator employable in the circuit of FIG. 2.

DESCRIPTION OF ILLUSTRATED EMBODIMENT

Referring to the drawings and particularly to FIG. 1, the present invention is applied to an arc-welding unit similar to that disclosed in applicant's previously identified U.S. Pat. No. 3,452,180. As more fully disclosed therein, an arc-welding head 1 is provided for feeding of an electrode 2 with respect to an overlapping seam joint 3a in a work member 3. The electrode 2 is adapted to be positioned in two perpendicular planes through the seam, basically identified as the vertical plane and the intersection horizontal plane. In addition, the electrode 2 is angularly oriented in the two planes to maintain a desired precise and optimum orientation of the electrode 2 with respect to the work member 3 and particularly the seam joint.

The present invention is particularly shown and described applied to a control system for movement of the electrode 2 in the horizontal plane and in particular, establishing a given constant velocity in such horizontal plane. The positioning in the vertical plane can be maintained in any desired manner, for example, as shown in the above Bollinger patent.

Generally, the horizontal plane drive system includes an X-axis drive motor 4 and a Z-axis drive motor 5 to maintain movements of the electrode 2 in two mutually-perpindicular paths within the horizontal plane. Further, an angle drive motor 6 is provided for angularly orienting of the electrode in the horizontal plane with respect to the overlapping seam of the work member 3. The interaction of the several drives maintain optimum positioning of the electrode 2 as the weld seam moves laterally within the horizontal plane.

In accordance with the illustrated embodiment of the invention, a seam follower or stylist 7 is attached to the arc welding head 1 and rides in the seam immediately in front of the tip of the electrode 2 to provide response to movement of the seam in the selected or given plane. The seam stylist 7 is coupled to the transducer 8, such as a differential transformer, which is mounted to move with the electrode assembly and provides an output signal related to the position of the seam in the Z-coordinate direction. The output of the transducer 8 which includes a suitable phase detector and amplifier is a direct current error signal linearly proportional to any movement or change in the Z-coordinate direction and of a polarity or sign corresponding to the direction of the error or change in position of the seam.

In the illustrated embodiment of the invention and in the arc-welding system for which the five-axis seam tracker is particularly adapted, the system is established to maintain a constant velocity vector of the electrode tip in the horizontal plane. Further, the work member 3 is located such that the welding is either in the horizontal or in a downhill manner. Thus, uphill welding is not desirable. However, the most significant aspect with respect to the present invention is the concept of actuating the several drive motors 4, 5 and 6 to maintain the movement of the electrode in the horizontal plane essentially constant. Although various systems have been suggested, such as disclosed in applicant's above-identified patent, there have been certain disadvantages arising from the interaction of the sensing systems. The present invention is particularly directed to a system for accurately and reliably driving of the several motors with essentially minimal interaction.

Referring particularly to FIG. 2, a block diagram of the horizontal plane drive system is shown constructed in accordance with the teaching of the present invention. Generally, the circuit includes a Z-axis drive loop or section 9 for energizing of the motor 5 to drive an output shaft 10 for positioning of the head 1 and electrode 2. An X-axis drive loop or section 11 similarly is provided with the motor 4 connected therein and actuating an output shaft 12 coupled to the head 1 for driving of the electrode 2 along the X-coordinate axis. An angle drive loop or section 13 similarly includes the angle motor 6 and is shown having an output shaft 14 coupled to the head 1 for angular orientation of electrode 2. The three drive loops are interconnected and constructed in the optimum circuit illustrated to respond to a single position-responsive input signal as established by the output of the differential transformer or transducer 8. As more fully developed hereafter, this provides essentially corresponding immediate response of the several drive sections in response to any change in the position of the weld seam of the work member 3 in the horizontal plane.

As more fully described hereinafter, the several control or drive loops are velocity voltage related and each of the sections includes a velocity-sensing means for maintaining the corresponding electrode velocity with an internal feedback loop to stabilize the drive output.

Referring particularly to Z-axis drive loop, a tachometer or other similar velocity generation means or unit 15 is coupled directly to the Z-axis drive shaft 10 to provide an output voltage proportional to the velocity of the shaft 10 and, therefore, the velocity of the electrode in the Z-coordinate. A similar velocity sensor or tachometer 16 is coupled to the X-axis drive shaft 12. An angle response stabilizing velocity sensor or tachometer 17 is further coupled to the related angle positioning shaft 14.

In accordance with the concept of the present invention, the electrode drive system is established to provide a variable input drive along one axis which, in the illustrated embodiment of the invention, is selected as the X-axis The movement of the seam and, consequently, the required movement of the electrode 2 in the mutually perpendicular axis or coordinate is sensed and the velocity of both drive motors 4 and 5 are adjusted in an interrelated manner to compensate for any required velocity change associated with a change in the lateral movement of the seam of work member 3. As previously noted, the electrode 2 is to move with a fixed horizontal vector velocity. Thus, if the electrode is moving directly in the X-direction, any lateral movement in the Z-direction would tend to accelerate the overall velocity in the horizontal plane. In accordance with the present invention, the drive in the perpendicular and X direction is adjusted to maintain the desired constant horizontal velocity.

More particularly, in the illustrated embodiment of the invention, the Z-axis drive section 9 includes a closed loop drive system having a motor-amplifier drive unit 18 interconnected to control the energization of the motor 5 and thereby the velocity of drive shaft 10. A first signal summing point 19 is diagrammatically illustrated having the internal feedback signal established by the Z-axis related tachometer 15 connected thereto. In addition, a proportional plus integral controller 20 interconnects the output of transducer 8 to the signal summing point 19 to provide a related positional sensed signal. The transducer 8 being mounted to the electrode head assembly provides a positional feedback as shown diagrammatically by the dashed line 20a. A cosine potentiometer 21 is inserted between the transducer 8 and the controller 20 to modify the transducer output signal. The cosine potentiometer 21 is mechanically coupled to the positioned in accordance with the position of shaft 14 and thus in accordance with the angular positioning of electrode 2. The proportional plus integral controller 20 is a compensating network generally employed in closed feedback loop systems to essentially eliminate steady state errors and the like. The Z-axis drive system thus drives the electrode in the Z-axis in accordance with the summation of the output of the transducer and the output of the tachometer 15 to maintain the electrode properly positioned in the Z-axis The Z-axis is under a position control with a velocity feedback signal to stabilize the circuit operation. As the seam gradually changes in the plane, the transducer signal is related to displacement errors in both the X and the Z displacements. The signal related to the Z-coordinate is the total error signal times the cosine of the angle. Although the presence of the cosine potentiometer 21 reintroduces some axis interaction back into the system, the compensation for Z-axis stability achieved results in a significant improvement. As hereinafter described, alternative methods might be employed to eliminate any possible interaction but have the disadvantage of increasing the cost.

The drive system as presently described particularly in the selected or given direction, the X-axis, employs an electronic computation of the required velocity signal as a function of the two coordinate velocity signals. This essentially eliminates interaction effects in the angular-sensed orientation such as encountered in prior art designs.

The X-axis drive section 11 generally also includes a motor-amplifier drive unit 22 interconnected in a closed-loop system to provide a similar energizing of the X-axis drive motor 4 positioning of the electrode 2 along with the X-coordinate. The input to the drive unit 22 is shown diagrammatically as having a common summing point 23 for establishing the velocity drive in the X direction. The summing point 23 is connected to the output of the X-axis drive related tachometer 16 and to a specialized signal unit 24 which establishes a signal which is related to the output of the Z-axis drive velocity. It is important to remember that in the present system, the basic premise is to maintain a constant velocity in the given plane. Prior systems have employed sine-cosine potentiometers attached to the angle axis drive to compute the desired horizontal velocity signal which, in turn, is applied to control the X- axis drive section. Such system is undesirable because of interaction between the angle drive and the X drive and Z drive systems.

The present invention is based on the realization that the desired relationship between the two coordinate mutually perpendicular axes which defines the constant velocity in the horizontal plane when one of the velocities is always of a given sign, such as with the one X direction, is that of a semicircle, as shown in FIG. 3. In FIG. 3, the desired horizontal velocity is shown by a vector 24a at the intersection of the graphical illustration for the two horizontal plane velocity vectors ($V_z$) 24b and ($V_x$) 24c, related to necessary voltage signals for a constant vector 24a. The unit 24 receives an input proportional to the velocity vector 24b for the Z-coordinate and generates a velocity control signal proportional to the velocity vector 24c. Unit 24 is a circle generating means inserted as the input to the X-axis drive section 11 to generate an output in accordance with FIG. 3 and provides a particularly unique and reliable energizing of the X-axis drive which is essentially independent of angle drive. Control amplifiers 25 and 26 are connected to the opposite sides of the unit 24. The input to the X-axis drive is taken from a summing point 27 having a signal line 28 connected to the output of the Z-axis tachometer 15. A second input line 29 adds a signal proportional to the output of the transducer 8 from the cosine potentiometer 21 as a modifying signal to improve the response of the X-axis drive system. In the X-axis drive, the circle generating means 24 electronically computes the required change in the X-axis velocity as a result of sensing a change in the Z-axis velocity and, in the illustrated embodiment, the initial position change.

As shown in FIG. 2, the angle axis drive section includes a motor-amplifier unit 30 which is coupled to the angle axis motor 6 and includes an input summing point 31. The input signal 28 proportional to the actual velocity in the Z-coordinate and with the modified transducer signal 8 a ded on for improved response is applied to summing point 31. A position feedback signal proportional to the horizontal velocity times the sine of the angle, derived from a voltage source 32 proportional to the horizontal velocity and a sine function potentiometer 33 coupled directly to the angle shaft 14, is subtracted from the input signal in summer 31 to give an error signal as input to summing point 34 which is connected to control the motor-amplifier unit 30.

The above angle drive system eliminates errors associated with controls responsive to the relative magnitudes of the two mutually perpendicular X-axis and Z-axis drive voltages. For example, in prior systems, the X-axis drive was a function of the Z-velocity voltage and as a result, the X-coordinate drive was a lagging function of the sensed Z-velocity voltage. The angle drive did not reach a steady state until transients had been eliminated and after both of the coordinate drives had reached a steady state condition. Further, as the angle increased, the rate of change in the X-coordinate axis velocity voltage increased and, at relatively large angles, the angle position drive was more sensitive to the X-coordinate velocity voltage and for smaller angles, it was conversely more sensitive to the Z-coordinate related velocity. The settling or damping time for the angle drive was thus different for large and small angles of positioning. This, in turn, resulted in an undesirable response characteristic. However, even more important was the inability of the angle drive system to distinguish between angles close to plus and minus 45°.

The angle control system was originally designed to zero on a function involving the sine of twice the angle. However, the sensitivity of response at an angle of approximately 45° is essentially zero. Generally, improved results have been obtained by the establishment of an error input signal which varies directly as the sine of the angle. This is relatively accurate and essentially provides a very stable and reliable operation as the actual welding angle, particularly for vehicle frame members and the like where the angle is normally between a plus or minus 50°.

The illustrated circuit which is related solely to the sine function cannot provide a highly sensitive response around plus or minus 90°. However, as actual welding angles will hardly ever exceed plus and minus 50°, the maximum desired stability is obtained.

Actual experiments have shown that the angle drive system can employ an external set point voltage proportional to the desired constant velocity to eliminate the problems associated with using the actual horizontal velocity which is not necessarily constant during tracing especially when transients occur in either of the mutually perpendicular drive systems.

Thus, in operation, the desired horizontal velocity is determined and a correspondingly related voltage signal is applied to the X-axis drive section summing point 23. The electrode 2 is then driven through the X-axis drive section. Any change in the weld seam of the work piece 3 from the Z coordinate results in a corresponding signal in the transducer 8. This signal is simultaneously applied after modification by the cosine potentiometer 21 to the two drive sections 11 and 13 to charge the energization of units 22 and 30 to provide the desired orientation of electrode 2 and to maintain the desired constant horizontal velocity. Energization of unit 18 is achieved with the same signal from potentiometer 21 after modification by the controller 20 which insures correspondence of the Z-axis position with the traced seam. The system thus provides a control of the three different positionings in response to a single sensed position or transducer in addition to the velocity feedback tachometer signals. This has been found to provide a highly accurate and reliable control. The Z-axis drive system and the angle drive systems employ generally conventional elements as shown in block diagram in FIG. 2 and consequently no further description thereof is given. The X-axis drive system, as previously noted, is specially constructed with the modifying circle generating means 24 and is more fully described in detail as follows.

Thus, the design as previously noted is based on maintaining a constant horizontal velocity with the correct velocity along the X-coordinate axis being preset and then varied as a function of the changes in the velocity in the Z-axis coordinate to maintain the desired horizontal velocity at its preset value. If the weld line was truly along the X-coordinate axis only, the summing point 23 would merely receive a reference signal from the unit 24 via amplifier 26 and the tachometer feedback 16, and drive the motor amplifier combination 22 to operate the motor at the predetermined, preset velocity along the X-axis as a result of corresponding rotation of the output shaft 12. The variation in the Z-axis however, is reflected in a signal output from the cosine potentiometer 21 at line 29 which varies the Z-axis drive and which, with the output voltage of the Z-axis tachometer 15, is applied to the X-axis drive section 11.

The voltage signal, as previously noted, is applied to an active circular generating means 24 which has the Z-axis coordinate velocity signal as an input and establishes an X-axis velocity control signal as an output.

In a particularly novel aspect of the present invention, the circle generating means 24 includes an absolute function generating unit 35 connected to the input signal in combination with a quarter circle generator 36. This is based on the realization that the control signal for the X-axis velocity is the same to the opposite sides of the zero reference. Thus, the semicircle function is symmetrical about the zero velocity signal in the Z-coordinate axis (FIGS. 6 or 7). Consequently, applicant realized that it is sufficient to define a quarter circle and combine it with the absolute value of the velocity signal to obtain the proper X-axis drive input signal which is accomplished by unit 24 including the units 35 and 36.

In the illustrated embodiment of the invention, the function generator 35 provides a linear V-shaped output to the opposite sides of the Z-axis velocity zero signal as shown at 35a and 35b. Thus, in FIG. 2, the Z-axis velocity voltage input is shown on the horizontal axis and the output voltage along the vertical axis of the graphical illustration. The input signal is offset with respect to the horizontal coordinate or output voltage by the radius of the circle function and particularly the voltage related to the desired constant horizontal velocity. Thus, with the Z-axis voltage signal equal to zero, the absolute function generator 35 establishes a negative output. As the velocity varies with respect to the zero point, it tracks either curve 35a or 35b. Thus, the output signal begins at a negative 9 volts and increases therefrom to a 0 volt as the Z-velocity signal varies from 0 to 9 volts. The input to the quarter circle generator unit 36 is, therefore, always a negative voltage related in amplitude to the amplitude of the input to unit 35 but independent of the phase or polarity. As noted, with the output of the absolute function generator at a minus 9 volts, the output of the circle generator 36 is a positive 9 volts corresponding to a maximum motor drive signal in the X direction. Conversely, as the absolute function generator signal increases, the output of the quarter circle generator 36 decreases as shown by trace 36a to provide a corresponding decrease in the X-axis velocity signal applied to the summing unit and thereby provides the desired reference signal in the X-axis direction. Thus, the horizontal velocity component is maintained at a constant 9 volts in the illustrated embodiment of the invention with the X-coordinate velocity vector varying directly with the horizontal velocity vector as the independent variable.

In accordance with a particular aspect of the present invention, the absolute function generator 35 and the quarter circle generating unit 36 is constructed, as shown schematically in FIG. 4.

Referring particularly to FIG. 4, the quarter circle generator unit 36 includes an operational amplifier 37 having its input interconnected to a bank of variable resistors 38 forming a part of the absolute function generator 35 as hereinafter described. The feedback network 39 for the operational amplifier 37 includes a feedback line within which a plurality of paralleled resistor-diode branches are provided, with each branch including a resistor 40 and a diode 41. The paralleled networks or branches are connected between the input of amplifier 37 and the output line 42 and the input of the amplifier 37 via a plurality of series-connected resistors 43. The resistors 43 are connected in series between each of the branches of the resistors 40 and diodes 41 to the negative bias supply.

The resistors 43 form a voltage-dividing network and determine when the corresponding diodes 41 will conduct and not conduct. Thus, as the output voltage at line 42 rises to the breakover level of the diode 41 in the first branch connected directly to line 42, the first diode 41 conducts and provides a first predetermined feedback signal. The voltage drop across the first resistor 43 lowers the voltage below that therefor required to break over the diode 41' of the next succeeding or second feedback branch and all subsequent branches. As the voltage at line 42 rises, the voltage at the junction of the second diode 41' and the first resistor 43 rises to the breakover level causing the second diode 41' to conduct. Thus, the continuous rise in the output voltage results in a continuous breakover, changing the feedback path and total resistance as established by the value of the resistors 40. As the feedback resistance is decreased with the movement from the first to the succeeding junctions or nodes in the feedback network, the gain of the circuit is lowered and the slope will correspondingly decrease. The resistors 40 thus determine the actual slope of the characteristic. The slope-determining resistors 40 are preferably made substantially greater in resistance value than the controlling resistances 43 such that resistors 40 will not essentially affect the break point voltage value. Further, with the resistor 40 substantially larger, the resistors 43 will not appreciably or significantly affect the slope of the output after conduction of the related diodes. The result of the circuit is, therefore, to closely approximate a quarter circle generator function by a plurality of short, straight line segments 45 as shown in FIG. 5. Eleven lines are shown of varying slope corresponding to 11 parallel branches although any desired number can be employed depending upon the desired degree of accuracy.

By assuming the diodes are essentially ideal, with zero resistance when conducting and infinite resistance when cut off, the desired values can be developed through mathematical calculations. Obviously, the diodes are never perfect and do not conduct at exactly the desired voltage and do have some finite resistance when conducting as well as leakage currents when cut off. As a matter of practical design, the controlling resistances can be calculated and the actual slope-controlling resistors experimentally inserted into the circuit in order to obtain the optimum or desired output characteristics.

The absolute function generator 35 also includes an operational amplifier 47 with an input resistor 48 connected to the input voltage signal from the transducer circuit. The feedback network for amplifier 47 includes a diode 49 and a resistor 50 connecting the output to the input of the amplifier 47. A diode 51 bypasses the operational amplifier 47 if the input voltage is of an improper polarity. The output of the operational amplifier 47 is connected through a variable potentiometer 52 of bank 38 to the input of the operational amplifier 37. A second ganged potentiometer 53 of bank 38 directly connects the input signal to the input of the operational amplifier 37 such that the signal applied is a summation of the signals transmitted via potentiometers 52 and 53. The potentiometers 52 and 53 are set to make the magnitudes of the slopes of the absolute value functions equal to each other and equal to 1. Thus, as shown in FIG. 2, the slope of the lines 35a and 35b will be equal to each other and equal to 1.

A variable voltage bias supply potentiometer 54 interconnects the operational amplifier 37 and the absolute function generator to a negative voltage supply to establish the desired voltage magnitude related to a selected, constant horizontal velocity. Thus, as previously described, the circle generator was selected to have a 9 volt radius with the output set by potentiometer 54.

Operational amplifiers 25 and 26 are connected to the input and output of the circle generating means 24 to permit adjustment of the radius of the circle generator unit and thereby permit varying of the horizontal velocity in a simple and reliable manner.

In the illustrated embodiment of the invention, the variable amplifier 25 is shown as operational amplifier 55 with a potentiometer 56 defining a feedback path. The input of the amplifier 55 is connected to the summing point 27 of FIG. 2 through a variable resistor or potentiometer 57. The potentiometer 57 is adjusted to match the voltage level of the Z-axis velocity vector voltage to that of the X-coordinate velocity voltage. Thus, it is important that the output tachometer voltage for both axes be related to the same number of inches per minute for both axes.

The output 26 is similarly constructed including an operational amplifier 58 with a fixed feedback resistor 59. The input to the operational amplifier 58 is connected to the output of the quarter circle generator unit 36 in series with a variable potentiometer 60. The potentiometers 56 and 60 must, for optimum results, be very accurately positioned. In accordance with an important aspect of the present invention, the potentiometers 56 and 60 are therefore preferably a two-cup potentiometer of a selected, relatively high-resistance range to provide simultaneous and accurate positioning, as shown by the ganged line 61. Varying of the resistance of potentiometers 56 and 60 changes the radius of the semicircle output to permit the setting and adjustment of the horizontal velocity. If the resistance is increased, the X-velocity voltage and the Z-velocity voltage signals will be decreased. The output of the amplifier 55, however, will be increased and raised to the same level as prior to the increase in the resistance of the potentiometer 56. This, in turn, insures that the internal functioning, that is, the input to the amplifier 47 and the output of the amplifier 37 will always remain the same, namely, with the desired radius of 9 volts. However, the output of the overall system will vary while maintaining the predetermined output circle generating function. Theoretically, the bias supply potentiometer 54 together with the bias voltage for resistors 43 can also be varied to change the radius of the output function reference. This, however, tends to changes the loading condition on the circuit and the output function loses its circular configuration for small radii.

The illustrated circuit for the X-axis drive basically is of the type "O" system which operates with a fixed error signal in the steady state to a step function input. As a result, the input and the output velocity voltage vectors will be in error in the steady state. The steady state error is essentially eliminated by selecting the proper value of an input resistor 63 to the operational amplifier 26 with the resistor 63 connected to the X-axis feedback velocity signal from tachometer 16. Further, the operational amplifier 26 is provided with a slight positive bias as shown by the potentiometer 62 to compensate for some coloumb friction within the drive system. This is practically acceptable because of the fixed direction of the X-axis velocity during tracing.

The X-axis drive system operates, in summary, as follows. The output of the Z-axis transducer 8 is applied through the cosine potentiometer 21 to the summing point 27 and added to the Z-velocity vector voltage signal from tachometer 15. The summated signal is applied as the input to the amplifier 25 which modifies the signals and impresses it upon amplifier 47 of the absolute function value generator 35. The output of the generator 35 is always a corresponding negative signal. A maximum negative 9 volt signal, corresponding to a zero input signal from the summing point 27, applied to a circle generator 36 results in a maximum positive output signal therefrom which, in turn, is applied to amplifier 58 of unit 26 and thereby to the summing point 23 to drive the motor amplifier unit 22. The output operates the associated motor and positioning shaft 12 at maximum output level, thereby driving the electrode in the X direction at the preset desired constant horizontal velocity.

If the weld line moves in the Z direction, a corresponding voltage signal is generated by the transducer 8. This signal is applied to the cosine potentiometer 21 and thus to the Z-axis drive system 9 resulting in energization of the motor amplifier unit 18 for driving of the electrode 2 in the Z direction. The driving in the Z direction is associated with the rotation of the output shaft 10 which drives the tachometer 15 and provides a proportionate velocity feedback signal. The signal is not only employed to stabilize the Z-axis drive system in accordance with the input signal but, further, simultaneously applied to the summing point 27 such that the output is the summation of the transducer voltage signal and the velocity feedback voltage signal. This is applied as the input to the circle generating means 24 after passing through the amplifier 25, regardless of the variation in the velocity signal. The absolute function generator 35 provides a corresponding new output voltage signal which is applied to the quarter circle generator unit 36 to establish a velocity vector voltage related to the required change in the X-axis drive system associated with the new Z-axis velocity movement. This signal is now applied to summing point 23 with the resulting change in the motor drive signal and the motor amplifier unit 22 readjusts the energization of the motor 4 to change the velocity of the shaft 12 and, therefore, the movement of head 1 and electrode 2 in the X-direction to the desired lower value to maintain the velocity in the horizontal direction constant.

The velocity feedback signal of the tachometer unit 15 could alone be employed. However, in this case, the velocity vector in the X-coordinate direction will lag the velocity vector in the Z-coordinate direction. This results in a tendency of an excessive variation in the horizontal velocity during angular electrode movement. Thus, referring particularly to FIGS. 6 and 7, if the electrode 2 is to move between the first given angle 63 and a second angle 64, it preferably should follow the circular function or the radius of the semicircle 65. In fact, depending upon whether the system is over to underdamped, it will follow either of two alternate paths. If the angle increases from a first angle to a second angle, the actual path may typically be either of the two paths 66 or 67 in FIG. 6 related respectively to an overdamped circuit and an underdamped circuit. If the angle reverts from the second to the first, the horizontal velocity vector will tend to decrease at the instant of time the change occurs and establish a pair of paths which are the mirror image of the paths shown in FIG. 6. The results occur because of the transient phenomena associated with the change and particularly because the velocity vector signals along are not precisely in phase. It is, therefore, desirable to add a signal to the velocity vector of the Z-axis tachometer 15 which is in phase with the Z-axis transducer signal such that the X-axis drive system 11 begins to respond at the same instant of time that the Z-axis drive system 9 starts to respond. The in-phase relationship requirement essentially limits the additional or modifying signal to that of the transducer 8 directly or the transducer signal modified by the cosine potentiometer 21. For large angles of orientation, the X-axis drive system 11 is undesirably sensitive to a change in the output of the transducer 8 and consequently the cosine potentiometer 21 modified signal is employed. This voltage is further desirably employed because it is zero only when the Z-axis velocity vector is at a correct steady state value. As a result, the adding of the two voltage signals maintains the steady state response of the X-axis drive system the same.

If the modifying transducer voltage signal is positive for any given time period, the Z-axis vector velocity increases. Conversely, if the modified transducer signal is a negative value during a given time period, the Z-velocity vector decreases. The modifying constant will change the paths 66 and 67 and may generally result in an opposite positioning of the paths with respect to the semicircle at the particular instant as at 68 and 69 in FIG. 7. A comparison of the two figures indicates that a certain optimum value of the modifying signal will minimize and essentially eliminate the error of deviation of the constant horizontal velocity vector from the semicircle. The output of the cosine potentiometer 21 is a leading first derivative of the velocity voltage signal and provides a highly desirable compromise signal which can be added to the velocity vector signal to provide the desired response compensation. Actually, the particular signal to be applied will vary with the underdamped and overdamped conditions. As for the underdamped case, the second derivative of the velocity voltage vector can be shown to be a most desired compensating signal. For the overdamped case, in turn, the first derivative is preferably employed. However, to employ two different compensation signals depending upon whether the response is under or overdamped is not practical and, furthermore, is made difficult as neither of the two derivatives appear at any particular terminal in the system. Applicant has found that the use of the leading first derivative of the velocity vector signal constitutes a reasonable compromise. The output of the cosine potentiometer 21 is, in fact, just such a leading first derivative of the voltage velocity signal.

The modifying voltage signals may be relatively low-level voltage signals while the velocity voltage vector may be a relatively high-level signal. The level of the modified transducer voltage signal may be raised to a desired or an optimum percentage of the voltage range of tachometer 15 through a suitable amplifying means, not shown.

The stability of the system is also improved with the valid assumption that the X-axis drive system is more responsive than the Z-axis drive system. Thus, referring to FIG. 2, the assumption is supported because the insertion of the proportional plus integral controller in the Z-axis drive system causes a tendency of the Z-axis system to lag the response of that axis.

The electronic circle generating means may, of course, be of any suitable construction. An alternative construction, which has been found to be particularly satisfactory, is shown in FIG. 8. In the embodiment of FIG. 8, a preset input or command signal voltage corresponding to the desired constant horizontal velocity is derived from a potentiometer 70 connected to a fixed direct current supply. The potentiometer tap 71 and the Z-axis velocity input voltage signal line 72 are connected to a summing amplifier 73 to establish a negative voltage equal to the algebraic sum of the two input voltages. The Z-axis velocity signal is also applied to an inverting amplifier 74, the output of which is connected to a second summing amplifier 75. The preset voltage signal is also applied directly to the second summing amplifier 75 to establish a second negative voltage equal to the algebraic sum of the two corresponding input voltages. A multiplier 76 is connected to the outputs of the summing amplifiers 73 and 75 and establishes a signal equal to the product of the two input signals, which corresponds to the equation $V_x^2 = V_h^2 - V_z^2$. This product signal is applied to a square root unit 77 including an operational amplifier 78 with a suitable multiplication feedback network 79 establishing an output signal proportional to the square root of the input; i.e., $V_x = \sqrt{V_h^2 - V_z^2}$. A polarity protective diode 80 is shown connected across the operational amplifier to conduct oppositely phased transient and noise signals and the like.

The output line 81 of the unit 77 is connected to the X-axis drive motor amplifier unit of FIG. 2 or the like.

In the illustrated embodiment of the invention, the velocity vector signal is the basic and only input signal. The output of the cosine potentiometer defines and is a sole source of information related to a change in the horizontal slope of a seam which is being traced. Using the cosine potentiometer signal for all three of the axes in a horizontal or given plane control provides a corresponding instantaneous input to each of the control units about the change in the seam direction and, in fact, one which is directly related with the Z-axis transducer. As a result, all of the three axis drive systems will start to respond immediately and correctly upon sensing a change in the slope of the seam in the given plane.

Various modes of carrying out the invention are contemplated as being within the scope of the following claims which particularly point out and distinctly claim the subject matter which is regarded as the invention.

1. A drive system having means for moving of a member in two related rectilinear directions within a selected plane and at adjustable velocities whereby the direction of movement within the plane is varied, comprising drive means for moving the member in the second direction, velocity-sensing means to sense and generate a related signal corresponding to the velocity movement in said second direction, and an active generating means having an input connected to said sensing means and having an output connected to the first drive means to control the velocity of said first drive means in accordance with changes in the velocity movement in said second direction, the output signal of the generating means varying with the input in accordance with a circular function.

2. The drive system drive of claim 1 wherein said generating means establishes an output in accordance with a semicircle function defined by the vector summation of the relative velocities in the two directions with the radius of the semicircle function corresponding to the selected constant velocity in the plane.

3. The drive system drive of claim 1 wherein said generating means includes an electronic signal generator having an output signal related to the input signal by a constant amplitude rotatable vector and connected so as the input signal from said velocity-sensing means generates an output signal related to the required velocity of the member in the first direction in order to maintain a constant velocity in the plane.

4. The drive system drive of claim 1 wherein said generating means includes an absolute function signal generator connected to said sensing means and establishing a corresponding polarity signal independent of the polarity of the input signal, and a quarter circle generator having an input means connected to said absolute function generator and an output signal related to said input by said circular function.

5. The drive system of claim 4 wherein said quarter circle generator includes an operational amplifier having a plurality of feedback impedance elements connected in parallel branches and each branch including a series-connected unidirectional conducting element and impedance elements between succeeding branches to the output side of the operational amplifier, whereby the output signal is essentially a quarter circle function in response to the input signal of said absolute function generator.

6. The drive system of claim 4 wherein said absolute function generator including an operational amplifier and a feedback network establishing a relatively negative reference output corresponding to the radius of the circle function with a relatively zero input and varying linearly in a corresponding direction with varying opposite polarity inputs to said zero input.

7. The drive system of claim 4 having an operational amplifier connected between the sensing means and the absolute function generator and having an adjustable feedback potentiometer, an output operational amplifier, an adjustable potentiometer connected to the output of the circle generating means and to said output operational amplifier, said potentiometers having ganged adjustable taps to control the radius of the circle function and thereby the velocity of the member in the given plane.

8. The drive system of claim 1 wherein said generating means includes an operational amplifier means having a plurality of feedback impedance elements connected in parallel branches and each branch including a series-connected unidirectional conducting element and impedance elements between succeeding branches to the output side of the operational amplifier means, whereby the output signal is essentially a circular function of the input signal.

9. The drive system of claim 8 wherein the generating means includes an absolute function generator having input means connected to the sensing means and an output means connected to said operational amplifier, said absolute function generator including an operational amplifier and a feedback network establishing a relatively negative reference output corresponding to the radius of the circle function with a relatively zero input and varying linearly in a corresponding direction with varying opposite polarity inputs relative to said zero input.

10. The drive system of claim 9 having an operational amplifier connected between the sensing means and the absolute function generator and having an adjustable feedback potentiometer, an output operational amplifier, an adjustable potentiometer connected to the output of the circle generating means and to said output operational amplifier, said potentiometers having ganged adjustable taps to control the radius of the circle function and thereby the velocity of the member in the given plane.

11. The drive system of claim 9 including an angle positioning means connected to maintain a selected angular orientation of the member in said plane, a position-sensitive means having an essentially fixed output in the steady state and an output proportional to the change in position in the second direction, a cosine function element connected to said position-sensitive means to produce an output proportional to the product of the position-sensitive means output and the cosine element and connected to the input of the absolute function generator, said cosine functional element being coupled to said angle positioning means for corresponding positioning.

12. The drive system of claim 1 wherein said generating means includes an operational amplifier having a plurality of feedback resistors connected in parallel branches and each branch including a series-connected diode, resistors connected between succeeding impedances to the output side of the operational amplifier, the diodes in succeeding branches being biased to conduct in response to an increased output amplitude of the amplifier to successively reduce the gain and thereby establish an output signal essentially corresponding to a circle function of the input signal.

13. The drive system of claim 12 wherein the generating means includes an absolute function generator having input means connected to the sensing means and an output means connected to said operational amplifier, said absolute function generator including an operational amplifier and a feedback resistor establishing a relatively negative reference output corresponding to the radius of the circle function with a relatively zero input and varying linearly in a corresponding direction with varying opposite polarity inputs relative to said zero input, and including adjustable potentiometers to preset the magnitudes of the slopes equal to each other and equal to one, an input operational amplifier connected between the sensing means and the absolute function generator and having a first circle control adjustable feedback potentiometer, an output operational amplifier, a second circle control adjustable potentiometer connected to the output of the circle generating means and to said output operational amplifier, said first and second circle control potentiometers including a dual-cup potentiometer to establish corresponding setting of the potentiometer taps to control the radius of the circle function and thereby the velocity of the member in the given plane.

14. The drive of claim 13 including an angle positioning means connected to maintain a selected angular orientation of the member in said plane, a position-sensitive means having an essentially fixed output in the steady state and an output proportional to the change in position in the second direction, a cosine function element connected to said sensitive means to produce an output proportional to the output of the sensitive means and connected to the input of an input operational amplifier, said cosine function element being coupled to said angle positioning means for corresponding positioning.

15. The drive system of claim 1 wherein said second drive means is a closed loop control, a third drive means angularly positions the member in a third direction, a transducer is coupled to sense the displacement error of the member in said second direction and establish a positional related signal, a cosine function generator coupled to the third drive means and connected to said transducer and to said active generating means and to said first drive means and to said third drive means.

16. The drive system of claim 1 including an angle positioning means connected to maintain a selected angular orientation of the member in said plane, a position-sensitive means having an essentially fixed output in the steady state and an output proportional to the change in position in the second direction, a cosine function element connected to said position-sensitive means to produce an output proportional to the product of the position-sensitive means output and the cosine element and connected to the input of the circle generating means, said cosine function element being coupled to said angle positioning means for corresponding positioning.

17. The drive system of claim 16 wherein said second drive means includes a closed loop feedback control unit having a proportional plus integral controller connected to the output of the cosine function element, and a summing input connected to the output of the controller said velocity sensing means.

18. The tool drive system of claim 16 wherein said positioning means includes a sine function generator coupled to the output angle position drive means, velocity signal means establishing an output proportional to the desired horizontal velocity and connected to the sine function generator to establish an output means, and an input means connected to actuate said angle position drive means and connected to said output means and to the output of said velocity sensing means.

19. The drive system of claim 16 wherein said second drive means includes a closed loop feedback control unit having a control input connected to the output of the cosine function element and having said velocity sensing means connected in an inner feedback loop within the closed loop, angle positioning means including a sine function generator coupled to the output angle position drive means, velocity signal means establishing an output proportional to the desired horizontal velocity and connected to the sine function generator to establish an output means, and an input means connected to actuate said angle position drive means and connected to said output means and to the output of said velocity sensing means and an angle velocity drive sensing means, and said first drive systems includes a velocity sensing means connected to the input in common with the output of the active generating means.

20. The drive system of claim 1 having a position-sensing means coupled to sense the position of the member in said second direction and establishing a corresponding position signal, and means to add said position signal to the velocity related signal as the input of said generating means.

21. The drive system of claim 1 wherein said generating means includes a first summing means having an input connected to said sensing means and to a preset signal means, a signal inverting means connected to said sensing means, a second summing means connected to said preset signal means and to said inverting means, multiplying means connected to said summing means, and a square root function means connected to said multiplying means and having an output connected to the first drive means to control the velocity of said first drive means, the output signal of the square root function means varying with the input in accordance with a circular function.

22. The drive system drive of claim 1 having a preset input means and wherein said generating means includes means to establish a pair of signals corresponding to the sum and to the difference of signals of said preset input means and said velocity sensing means, and means to multiply said pair of signals, and means to take the square root of said last named means to establish said output signal.

* * * * *

UNITED STATES PATENT OFFICE
CERTIFICATE OF CORRECTION

Patent No. 3,624,343    Dated November 30, 1971

Inventor(s) ERIK STJERNSTROM and JOHN G. BOLLINGER

It is certified that error appears in the above-identified patent and that said Letters Patent are hereby corrected as shown below:

Column 1, Line 50, cancel "X-axis" and insert --- Z-axis ---.

Column 3, Line 11, cancel "practice" and insert --- practical ---;

Column 5, Line 33, cancel "the" and insert --- and --- before "positioned";

Column 9, Line 50, insert --- amplifier --- after the word "output";

Column 12, Line 39, after "the" (second occurrence) insert --- first direction, drive means for moving the member in the ---;
CLAIM 1

Column 14, Line 16, after "drive" insert --- system ---;
CLAIM 14

Signed and sealed this 15th day of August 1972.

(SEAL)
Attest:

EDWARD M.FLETCHER,JR.        ROBERT GOTTSCHALK
Attesting Officer            Commissioner of Patents